(12) United States Patent
Jerzak et al.

(10) Patent No.: US 9,002,822 B2
(45) Date of Patent: *Apr. 7, 2015

(54) COST MONITORING AND COST-DRIVEN OPTIMIZATION OF COMPLEX EVENT PROCESSING SYSTEM

(75) Inventors: Zbigniew Jerzak, Walldorf (DE); Thomas Heinze, Walldorf (DE); Yuanzhen Ji, Walldorf (DE)

(73) Assignee: SAP SE, Walldorf (DE)

( * ) Notice: Subject to any disclaimer, the term of this patent is extended or adjusted under 35 U.S.C. 154(b) by 272 days.

This patent is subject to a terminal disclaimer.

(21) Appl. No.: 13/529,681

(22) Filed: Jun. 21, 2012

(65) Prior Publication Data

US 2013/0346390 A1      Dec. 26, 2013

(51) Int. Cl.
*G06F 7/00*      (2006.01)
*G06F 17/00*     (2006.01)
*G06F 17/30*     (2006.01)

(52) U.S. Cl.
CPC ................................. *G06F 17/30103* (2013.01)

(58) Field of Classification Search
None
See application file for complete search history.

(56) References Cited

U.S. PATENT DOCUMENTS

| | | | | |
|---|---|---|---|---|
| 8,713,049 | B2 * | 4/2014 | Jain et al. ........................ | 707/779 |
| 2010/0030896 | A1 * | 2/2010 | Chandramouli et al. ..... | 709/224 |
| 2010/0125574 | A1 * | 5/2010 | Navas ............................ | 707/722 |
| 2011/0041132 | A1 * | 2/2011 | Andrade et al. .............. | 718/102 |
| 2013/0166712 | A1 * | 6/2013 | Chandramouli et al. ..... | 709/223 |
| 2013/0263120 | A1 * | 10/2013 | Patil et al. ......................... | 718/1 |
| 2013/0290959 | A1 * | 10/2013 | Beaty et al. ...................... | 718/1 |

OTHER PUBLICATIONS

Alexander Alexandrov, Dominic Battre, Stephan Ewen, Max Heimel, Fabian Hueske, Odej Kao, Volker Markl, Erik Nijkamp, and Daniel Warneke, "Massively parallel data analysis with pacts on nephele." PVLDB, 3(2):1625-1628, 2010.

David Alves, Pedro Bizzaro, and Paulo Marques, "Flood: elastic streaming mapreduce." In DEBS'10, pp. 113-114, 2010.

Michael Armbrust, Armando Fox, Rean Griffith, Anthony D. Joseph, Randy Katz, Andy Konwinski, Gunho Lee, David Patterson, Ariel Rabkin, Ion Stoica, and Matei Zaharia, "A view of cloud computing." Communications of the ACM, 53(4):50-58, Apr. 2010.

A. Bialecki, M. Cafarella, D. Cutting and O. O'Malley. "Hadoop: a framework for running applications on large clusters built of commodity hardware," 2005.

(Continued)

*Primary Examiner* — Susan Chen
(74) *Attorney, Agent, or Firm* — Fountainhead Law Group PC

(57) ABSTRACT

A cost monitoring system can monitor a cost of queries executing in a complex event processing system, running on top of a pay-as-you-go cloud infrastructure. Certain embodiments may employ a generic, cloud-platform independent cost model, multi-query optimization, cost calculation, and/or operator placement techniques, in order to monitor and explain query cost down to an operator level. Certain embodiments may monitor costs in near real-time, as they are created. Embodiments may function independent of an underlying complex event processing system and the underlying cloud platform. Embodiments can optimize a work plan of the cloud-based system so as to minimize cost for the end user, matching the cost model of the underlying cloud platform.

18 Claims, 11 Drawing Sheets

(56) References Cited

OTHER PUBLICATIONS

Andrey Brito, Andrew Martin, Thomas Knauth, Stephan Creutz, Diogo Becker De Brum, Stefan Weigert, and Christof Fetzer, "Scalable and low-latency data processing with streammapreduce." In 3rd IEEE International Conference on Cloud Computing Technology and Science, pp. 48-58, Athens, Greece, Nov. 2011. IEEE Computer Society.
E.G. Coffman Jr, M.R. Garey, and D.S. Johnson, "Approximation algorithms for bin packing: A survey. In Approximation algorithms for NP-hard problems," pp. 46-93. PWS Publishing Co., 1996.
Joseph P. Corrigan, "Opra updated traffic projections for 2012 and 2013." Technical report, Options Price Reporting Authority, Aug. 2011.
Lars Dannecker, Robert Schulze, Matthias Bohm, Wolfgang Lehner, and Gregor Hackenbroich. "Context-aware parameter estimation for forecast models in the energy domain." In SSDBM 2011: 23rd International Conference on Scientific and Statistical Database Management, vol. 6809, pp. 491-508. Springer, 2011.
Jeffrey Dean and Sanjay Ghemawat, "Mapreduce: simplified data processing on large clusters." Commun. ACM, 51(1)107-113,2008.
Alan J. Demers, Johannes Gehrke, Biswanath Panda, Mirek Riedwald, Varun Sharma, and Walker M. White. "Cayuga: A general purpose event monitoring system." In CIDR'07: Third Biennial Conference on Innovative Data Systems Research, pp. 412-422, Asilomar, CA, USA, 2007.
Bugra Gedik, Henrique Andrade, Kun-Lung Wu, Philip S. Yu, and Myungcheol Doo, "Spade: The system's declarative stream processing engine." In Jason Tsong-Li Wang, editor, Proceedings of the 2008 ACM SIGMOD international conference on Management of data, pp. 1123-1134, Vancouver, BC, Canada, Jun. 2008 ACM.
Vincenzo Gulisano, Ricardo Jimenez-Peris, Marta Patino-Martinez, and Patrick Valduriez, "Streamcloud: A large scale data streaming system." In Proceedings of the 2010 IEEE 30th International Conference on Distributed Computing Systems, ICDCS '10, pp. 126-137, Washington, DC, USA, 2010. IEEE Computer Society.
Thomas Heinze. "Elastic complex event processing." In Proceedings of the 8th Middleware Doctoral Symposium, MDS '11, pp. 4:1-4:6, New York, NY, USA, 2011. ACM.
M. Hong, M. Riedewald, C. Koch, J. Gehrke, and A. Demers, "Rule-based multi-query optimization." In Proceedings of the 12th International Conference on Extending Database Technology: Advances in Database Technology, pp. 120-131. ACM, 2009.
Zbigniew Jerzak, Anja Klein, and Gregor Hackenbroich, Reasoning in Event-Based Distributed Systems, chapter GINSENG Data Processing Framework, pp. 125-150. Springer Berlin, Heidelberg, 2011.
Jaeyeon Jung, Balachander Krishnamurthy, and Michael Rabinovich, "Flash crowds and denial of service attacks: characterization and implications for cdns and web sites." In Proceedings of the 11th international conference on World Wide Web, pp. 293-304, Honolulu, Hawaii, USA, 2002.
W. Kleiminger, E. Kalyvianaki, and P. Pietzuch, "Balancing load in stream processing with the cloud." In Proceedings of the 6th International Workshop on Self Managing Database Systems (SMDB 2011), Hannover, Germany. IEEE, 2011.
H. Kllapi E. Sitaridi, M.M. Tsangaris, and Y. Ioannidis, "Schedule optimization for data processing flows on the cloud." In Proceedings of the 2011 international conference on Management of data, pp. 289-300. ACM, 2011.
T. Knauth and C. Fetzer, "Scaling non-elastic applications using virtual machines." In 4th International Conference on Cloud Computing, page TBD, Los Alamitos, CA, USA, Jul. 2011. IEEE Computer Society.
D. Kossman, T. Kraska, and S. Loesing, "An evaluation of alternative architectures for transaction processing in the cloud." In Ahmed K. Elmagarmid and Divyakant Agrawal, editors, Proceedings of the ACM SIGMOD International Conference on Management of Data, pp. 579-590, Indianapolis, Indiana, USA, Jun. 2010. ACM.
Yannis Kotidis and Nick Roussopoulos, "A case for dynamic view management." ACM Trans. Database Syst., 26(4):388-423, 2001.
Leonardo Neumeyer, Bruce Robbins, Anish Nair, and Anad Kesari, "S4: Distributed stream computing platform" In Wei Fan, Wynne Hsu, Geoffrey I. Webb, Bing Liu, Chengqi Zhang, Dimitrios Gunopulos, and Xindong Wu, editors, ICDMW 2010: The 10th IEEE International Conference on Data Mining Workshops, pp. 170-177, Sydney, Australia, Dec. 2010. IEEE Computer Society.
P. Pietzuch J. Ledlie, J. Scneidman, M. Roussopoulos, M. Welsh and M. Seltzer, "Network-aware operator placement for stream-processing systems." In Data Engineering, 2006. ICDE'06. Proceedings of the 22nd International Conference on, pp. 49-49. IEEE, 2006.
K.L. Wu. "Elastic scaling of data parallel operators in stream processing." In Parallel & Distributed Processing, 2009. IPDPS 2009. IEEE International Symposium on, pp. 1-12. IEEE, 2009.
N.P. Schultz-Moller, M. Migliavacca, and P. Pietzuch, "Distributed complex event processing with query rewriting." In Proceedings of the Third ACM International Conference on Distributed Event-Based Systems, pp. 1-12. ACM, 2009. operator placement.
Mehul A. Shah, Joseph M. Hellerstein, Sirish Chandrasekaran, and Michael J. Franklin. "Flux: An adaptive partitioning operator for continuous query systems." In Umeshwar Dayal, Krithi Ramamritham, and T. M. Vijayaraman, editors, ICDE 2003: Proceedings of the 19th International Conference on Data Engineering, pp. 25-36. IEEE Computer Society, Mar. 2003.
Lisa K. Stapleton "Taming big data." IBM Data Management Magazine, 16:12-18, 2011.
Hong-Linh Truong and Schahram Dustdar. "Composable cost estimation and monitoring for computational applications in cloud computing environments." Procedia Computer Science, 1(1):2175-2184, 2010.
J. Wolf, N. Bansal, K. Hildrum, S. Parekh, D. Rajan, R. Wagle, K.L. Wu, and L. Fleischer "SODA: An optimizing scheduler for large-scale stream-based distributed computer systems." In Proceedings of the 9th ACM/IFIP/USENIX International Conference on Middleware, pp. 306-325. Springer-Verlag New York, Inc., 2008.
ElasticHosts, Cloud hosting pricing, internet reference, retrieved from: http://www.elastichosts.com/cloud-hosting/pricing—Printed on Jun. 19, 2012.

\* cited by examiner

COST MONITORING AND COST-DRIVEN OPTIMIZATION OF COMPLEX EVENT PROCESSING SYSTEM

BACKGROUND

Embodiments of the present invention relate to complex event processing (CEP) systems, and in particular, to monitoring and optimization of same.

Unless otherwise indicated herein, the approaches described in this section are not prior art to the claims in this application and are not admitted to be prior art by inclusion in this section.

Scalable, distributed streaming systems can automatically scale up with the increasing load. This property matches the cloud computing paradigm, which presents the user with an illusion of an infinite resource pool available on demand.

However, the automatic consumption of a varying number of computing resources, combined with dynamic varying load patterns, implies the unpredictability of the resulting bill when a given streaming system is deployed on a cloud platform.

Accordingly, the present disclosure addresses these and other issues with systems and methods providing cost monitoring and cost-driven optimization of a complex event processing system.

SUMMARY

A cost monitoring system can monitor a cost of queries executing in a complex event processing system, running on top of a pay-as-you-go cloud infrastructure. Certain embodiments may employ a generic, cloud-platform independent cost model, multi-query optimization, cost calculation, and/or operator placement techniques, in order to monitor and explain query cost down to an operator level. Certain embodiments may monitor costs in near real-time, as they are created. Embodiments may function independent of an underlying complex event processing system and the underlying cloud platform. Embodiments can optimize a work plan of the cloud-based system so as to minimize cost for the end user, matching the cost model of the underlying cloud platform.

An embodiment of a computer-implemented method comprises causing a cost calculator component of a complex event processing (CEP) system, to index operators of a query received from a user. The cost calculator component is caused to reference a cost model of the CEP system to assign an operator placement algorithm to the query. A query optimization component of the CEP system is caused to perform a query optimization to generate an optimized query. An operator placement component of the CEP system is caused to use the operator placement algorithm with the optimized query, to calculate a chosen operator placement. The operator placement component is caused to deploy the optimized query onto a scalable streaming system. The cost calculator component is caused to track and collect run-time information regarding the optimized query on an operator level and on a query level from the scalable streaming system. The cost calculator component is caused to calculate monitored costs of the optimized query and to communicate the monitored costs to the user.

An embodiment of a non-transitory computer readable storage medium embodies a computer program for performing a method comprising causing a cost calculator component of a complex event processing (CEP) system, to index operators of a query received from a user. The cost calculator component is caused to reference a cost model of the CEP system to assign an operator placement algorithm to the query. A query optimization component of the CEP system is caused to perform a query optimization to generate an optimized query. An operator placement component of the CEP system is caused to use the operator placement algorithm with the optimized query, to calculate a chosen operator placement. The operator placement component is caused to deploy the optimized query onto a scalable streaming system. The cost calculator component is caused to track and collect run-time information regarding the optimized query on an operator level and on a query level from the scalable streaming system. The cost calculator component is caused to calculate monitored costs of the optimized query and to communicate the monitored costs to the user.

An embodiment of a computer system comprises one or more processors and a software program executable on said computer system. The software program is configured to cause a cost calculator component of a complex event processing (CEP) system, to index operators of a query received from a user. The software program is further configured to cause the cost calculator component to reference a cost model of the CEP system to assign an operator placement algorithm to the query. The software program is further configured to cause a query optimization component of the CEP system to perform a query optimization to generate an optimized query. The software program is further configured to cause an operator placement component of the CEP system to use the operator placement algorithm with the optimized query, to calculate a chosen operator placement. The software program is further configured to cause the operator placement component to deploy the optimized query onto a scalable streaming system. The software program is further configured to cause the cost calculator component to track and collect run-time information regarding the optimized query on an operator level and on a query level from the scalable streaming system. The software program is further configured to cause the cost calculator component to calculate monitored costs of the optimized query and to communicate the monitored costs to the user.

In certain embodiments, the cost model comprises a processing cost, a memory cost, and a network cost.

According to some embodiments, the chosen operator placement is calculated according to a bin packing approach.

In particular embodiments, the operator placement algorithm comprises an initial operator placement, and a subsequent runtime operator placement.

In various embodiments, the query optimization comprises creating a global query graph.

The query optimization may comprise reusing common parts between the query and the global query graph.

The following detailed description and accompanying drawings provide a better understanding of the nature and advantages of particular embodiments.

DETAILED DESCRIPTION

Described herein are techniques for complex event processing. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments relate to systems and methods allowing monitoring of costs for scalable could-based streaming systems. Embodiments may include one or more of the following features:
(1) the ability to monitor the cost of running queries;
(2) the ability to use estimation mechanisms to prevent the occurrence of a bill shock;
(3) the ability to provide an explain for cost functionality which can be used to monitor the running cost of queries at the single operator level;
(4) the ability to perform query optimization, thus increasing the overall system yield and reducing costs for the end user; and/or
(5) the ability to tune the operator placement algorithms in order to minimize the end user cost depending on the cost model used by the cloud provider.

Streaming systems operate on streaming data which is fed continuously from unbounded sources. Examples of such streaming data sources include the stock market feeds, energy consumption data, or sensor data from equipment monitoring appliances. Operation on data which is continuously generated, can make it difficult to estimate or predict how much workload a streaming system will experience in the future.

Figure 1:
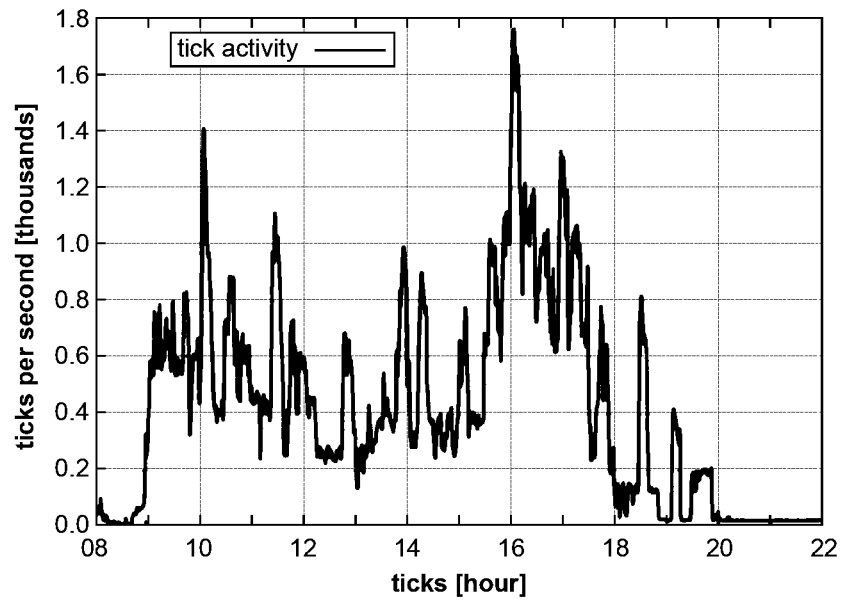
FIG. 1 shows a 14 hour histogram of a Frankfurt Stock Exchange tick stream volume

The variability of a typical workload is reflected in the Frankfurt Stock Exchange tick volume in FIG. 1. Such operating environments offer a clear contrast to static data processing systems where the amount of data which needs to be processed is known a priori or can be reliably sampled. This issue of fluctuation in data volume may be further exacerbated by phenomena such as flash crowds (also known as a slashdot effect), wherein an unpredictable event can cause a surge (with a factor as high as 100) in the number of data and/or requests that a system needs to process.

Moreover, streaming systems deployed in an on demand environment, are designed to be exposed to multiple users simultaneously. This implies that such systems will receive a varying number of queries from multiple sources. In certain data warehouse environments, an amount of concurrent queries running on top of such cloud-based streaming systems can be high, e.g. 100,000.

The inability to predict future workloads (both in terms of data and queries), in combination with automatic scalability and pay as you go model, can result in a bill shock. A bill shock occurs where a system automatically consumes additional resources to cope with a sudden surge in load, which then results in the customer being charged much more than the usual amount for a given period.

In order to address one or more of the issues raised above, systems and methods according to embodiments may monitor and actively adjust execution of the cloud-based streaming systems on a frequent basis, so as to reduce or avoid the occurrence of a bill shock.

Embodiments may feature one or more of the following components.
1. An infrastructure independent bill shock prevention system monitors the monetary cost of the execution of a streaming system.
2. An explanation for cost system provides a visual breakdown of the monetary cost for the execution of a given set of queries, possibly down even to a single operator level.
3. A cost driven operator placement system optimizes the scalability of the streaming system depending on the underlying cloud computing platform and its cost model
4. A fine grained query optimization component detects overlap between different queries and reuses similar parts of different queries to achieve higher system utilization and lower total cost for the user.

Embodiments may be independent of the underlying distributed scalable streaming system, as well as independent of the underlying cloud infrastructure. This allows embodiments to be deployed on top of any streaming or CEP platform running on top of any Infrastructure-as-a-Service.

Figure 2:
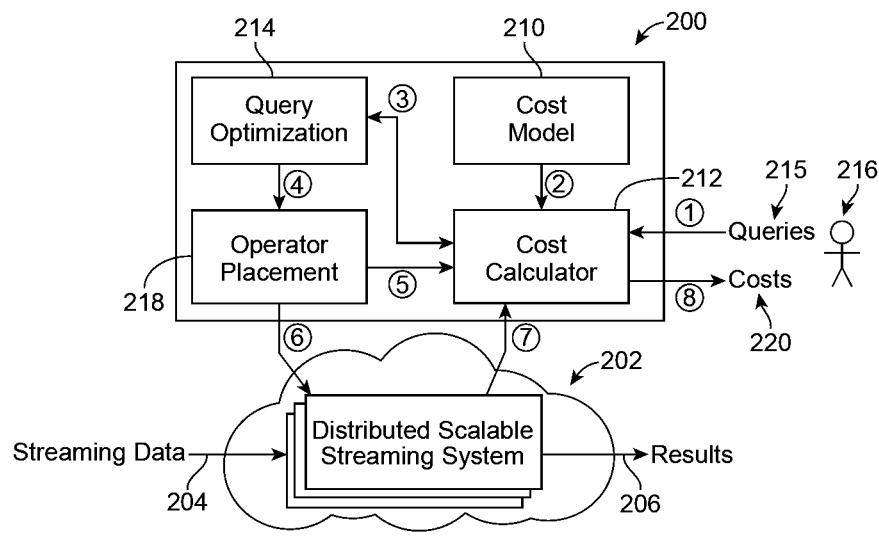
FIG. 2 is a simplified diagram showing a basic system architecture according to an embodiment.

FIG. 2 illustrates interaction between components of a system according an embodiment. In particular, complex event processing system 200 is configured to interact with a distributed scalable streaming system 202 receiving streaming data 204 as input, and process same to produce an output 206.

The CEP system 200 comprises a cost model 210 component. A goal of the cost model component is to maintain a generic, extensible billing model for different clouds.

The cost model component serves as an input to the cost calculator component 212. The cost calculator component keeps track of the running costs for the streaming system deployed in the cloud.

The CEP system 200 further comprises a query optimization component 214. The query optimization component accepts queries 215 issued by the user 216, and constructs a global, optimized query graph.

The global, optimized query graph is subsequently deployed by the operator placement component 218 within the running cloud-based streaming system.

Embodiments of complex event processing systems may function according to an operator level programming model. In this model, an operator is the smallest building block of a query. For example a simple query to calculate an index value for three companies A, B, and C, might involve several operators such as:

(1) a filter operator to select the data relevant to companies A, B, and C;
(2) a mathematical operator to calculate the market capitalization for each of the companies; and
(3) a join operator to calculate the final index value.

Figure 2A:
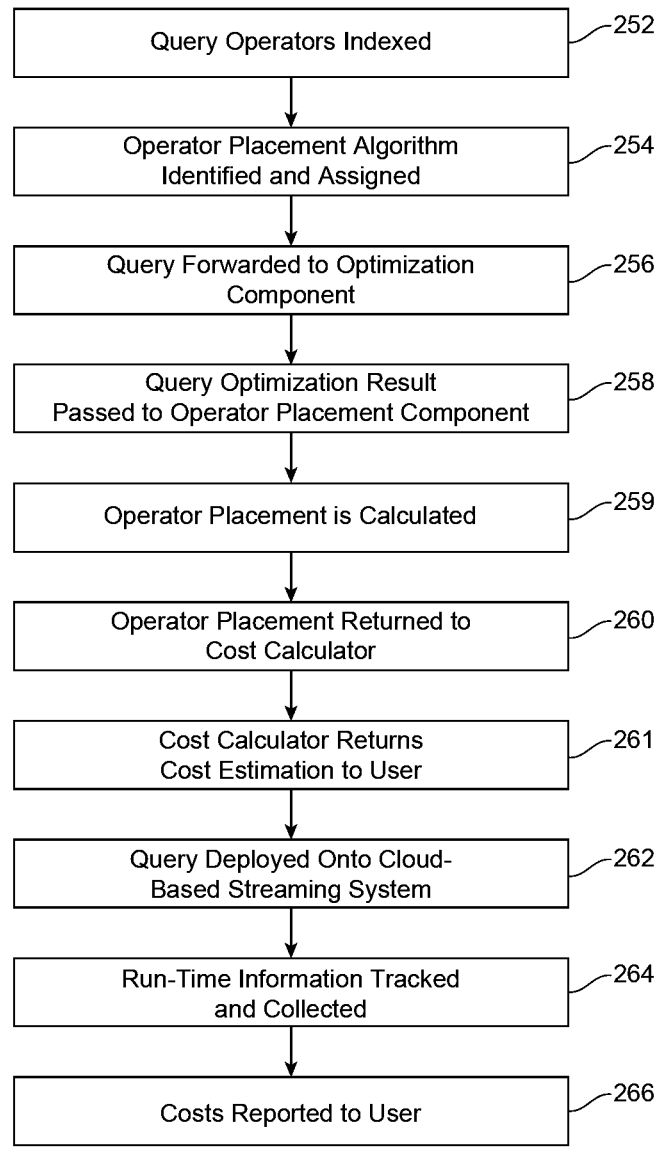
FIG. 2A is a simplified flow diagram showing a method according to an embodiment.

FIG. 2A is a simplified flow diagram explaining interaction between components of the embodiment of FIG. 2, in a process 250 of adding a new query and monitoring of the streaming system. In step 252, the new query is inserted by the user, and its operators are indexed by the cost calculator component.

In step 254, based on the cost model for the given cloud system, an appropriate operator placement algorithm is identified and assigned to the given query. In step 256, the query is subsequently forwarded to the optimization component.

In step 258, the result of the query optimization 284 is passed over to the operator placement component. In step 259, operator placement is calculated. The operator placement component uses the placement algorithm to calculate a best cost efficient placement of operators on cloud hosts, for the given cost model using an algorithm.

In step 260, the operator placement component returns the chosen operator placement (operator to host mapping) to the cost calculator component. In step 261, the cost calculator can then return the first cost estimation to the user.

In step 262, the operator placement component deploys the query onto the cloud based streaming system. In step 264, the cost calculator component tracks and collects runtime information on an operator and query level.

In step 266, the monitored costs 220 of running queries are reported in a streaming fashion to the end user.

Figure 2B:
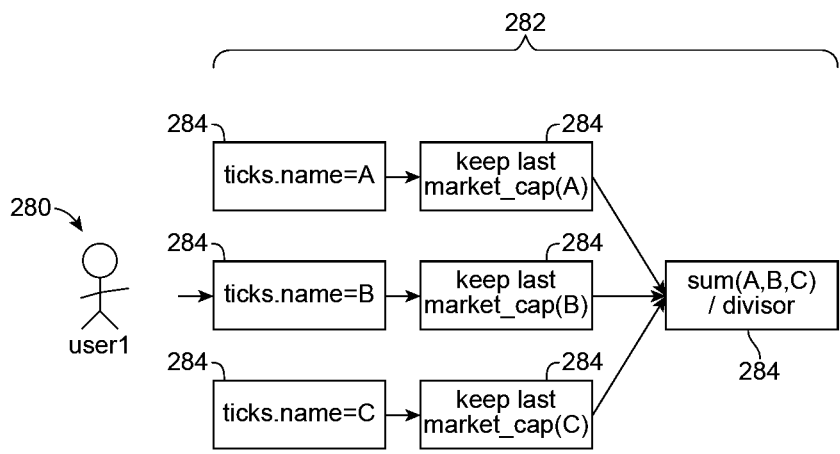
FIGS. 2B-2C show details of certain aspects according to an embodiment.
Figure 2C:
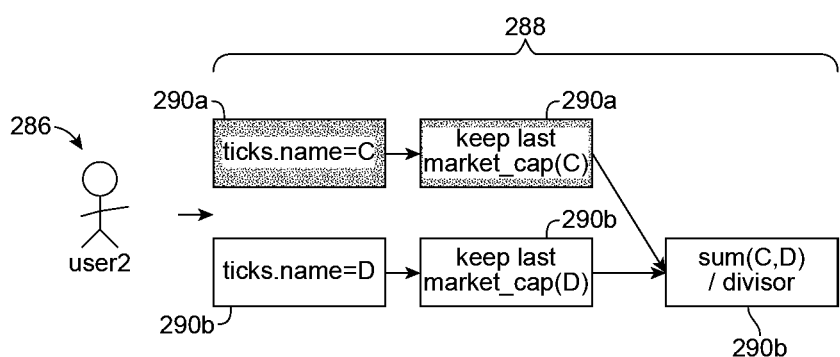

FIGS. 2B-C show details of the process flow just discussed. For example, FIG. 2B shows a case where a user 280 (USER 1) issues an original query 282. This query comprises seven operators 284.

In the step 252 of FIG. 2A, the operators are indexed. A purpose of this step is for the cost component to keep its own, internal assignment between a user who has issued the query, the query itself, and operators belonging to the query. This assignment/indexing is employed in the cost calculation as further described below. The indexing does not modify the query issued by the user.

Query optimization next occurs. In this example, since this is the first query there are no other queries in the system yet. Thus, the optimization step does not perform any operations. Therefore the optimized query is the same as the original query issued by the USER1.

In the calculation of operator placement, the seven operators from the original query are assigned to a number of physical or virtual hosts which are able to execute the query. This results in the operator placement being associated with the optimized query.

After this step, the result of the operator placement can be returned to the Cost Calculator. The cost calculator can then return the first cost estimation to the user.

Subsequently, given the calculated assigment of operators to hosts, the actual process of placing of the operators on hosts is executed (step 262. FIG. 2A). This is the query deployment.

Once the query has been deployed, run-time information (e.g. CPU load, Network bandwidth consumption, RAM usage) is collected and processed by the Cost Calculator. The collected data is transformed into monetary cost using the Cost Model, and reported to the user who issued the query. The indexing previously performed, allows the system to associate the query and query results with a particular user.

Since the runtime information is being collected on the operator level, the indexing allows the Cost Calculator to combine operators into queries. This provides per-query information on monetary costs to the users.

FIG. 2C shows a different user 286 (USER2) adding a second query 288. This second query comprises five operators 290a, 290b.

Processing of this query is similar. First, operators, the query, and the user, are indexed in the Cost Calculation component.

Subsequently, the query optimization is performed. Here, the system already contains the first query issued by the USER1. Thus in the query optimization, the system notices that both queries share a common part 290a. The system will therefore pass only the operators 290b of the query issued by the USER 2, to the operator placement component. The operators 290b represent the optimized query. The optimized query is then forwarded to the placement component.

The remainder of the procedure is the similar to the query issued by the USER 1. However, a difference is now taking place with respect to the cost calculation for both users.

Specifically, since two operators are shared by the USER 1 and USER 2 the costs. for running of the first query for the USER 1 will decrease, while the costs for running of the second query for the USER 2 will be lower than if he had issued the query into an empty system. This is due to the fact that the costs for both operators 290a are now shared across two users benefiting from their execution (as opposed to being fully paid for by just one user). The explanation of cost calculation and cost sharing is given further below.

Certain aspects of the above process flow are now described in detail according to particular embodiments.

Query Optimization

A goal of the query optimization function is to find and reuse common parts within user submitted queries. One approach to query optimization is to detect whether a user has submitted a query which is identical with a query which is already running in the system. In such case it might be more efficient to simply reuse the results of the already running query of the first user and deliver those to the second user. This avoids two identical results (queries) being computed in parallel by the same infrastructure. This in turn translates to higher yield from the same hardware.

A yield is defined as the ability to accommodate a given amount of users using the same physical infrastructure. High yield translates to the lower costs for the end user.

Query optimization is one feature for streaming systems because user created queries often contain common subparts, and continuous streaming queries are by definition long lived. While theoretical lifetime of continuous streaming queries (as opposed to classical databases) is unbounded, a practical lifetime of such queries can easily span multiple days and weeks. Moreover, if one considers that a cloud-based streaming system can be used to process as many as 100,000 queries simultaneously, query optimization can be useful.

Embodiments may takes a fine grained look at the query optimization problem as it operates on the operator level. According to certain embodiments, a query optimization component may maintain a global query graph comprising queries running in the cloud-based streaming system.

Figure 3:
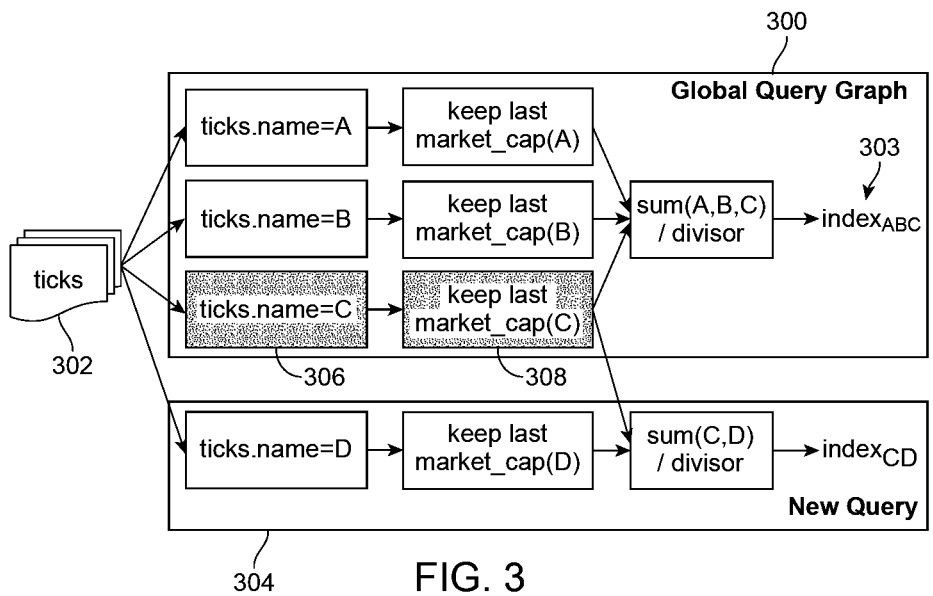
FIG. 3 is a simplified view showing an example of query optimization.

FIG. 3 is a simplified diagram showing an example of query optimization according to an embodiment. In FIG. 3 the global query graph 300 includes one query relating to financial information (ticks 302). This query calculates an index 303 for three companies: A, B, and C.

When a (possibly different) user issues a new financial query 304 asking the system to calculate the index for companies C and D, query optimization according to an embodiment will incrementally merge that new query into the global query graph. In the merge process, the query optimizer will reuse the common parts between the new query and the global query graph. These common parts are shown with reference numbers 306 and 308.

The re-use of parts of queries to answer questions from multiple users, may have a direct impact on the costs. If the query optimization component detects an overlap between two queries, the costs for the shared operators will be split proportionally across the users whose queries benefit from such operators. This in turn translates directly to a lower per query cost for all users of the system.

Operator Placement Using Bin Packing

The global query graph may maintain queries present in the system. The actual assignment of operators within the global query graph, to the hosts of the cloud-based streaming system, is performed by the operator placement component.

The operator placement problem may comprise an extended version of the task assignment problem, as operators within global query graph are dependent on each other by forming successor and predecessor relations.

According to certain embodiments, operator placement may be based on task assignment approach known as bin packing. In particular embodiments, a bin packing approach may model operators of the global query graph as elements which can occupy free capacity of the system they are deployed onto.

Figure 4:
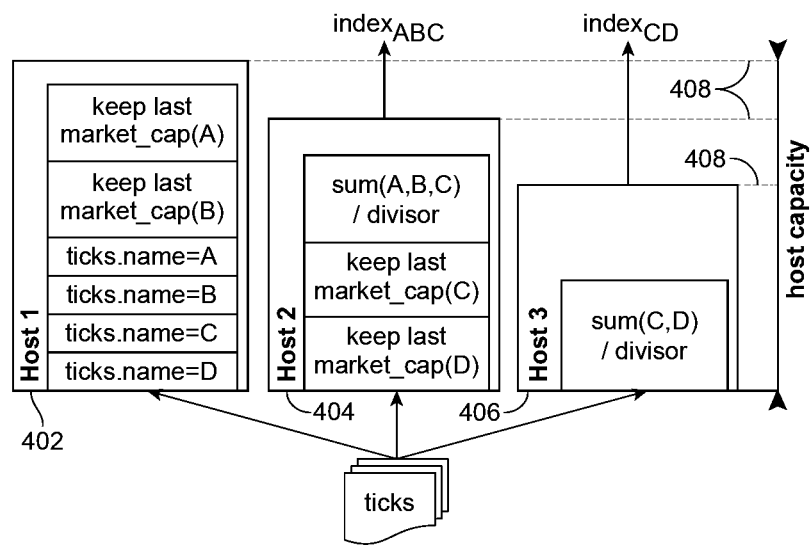
FIG. 4 is a simplified view showing an example of bin packing.

As shown in FIG. 4, the cloud based streaming system may be modeled as a set of heterogeneous processing hosts 402, 404, 406, each having an own capacity 408 regarding its available CPU resources, RAM, and incoming and outgoing network bandwidth. The operator placement component may try to find a best fit between the global query graph operators and available capacity of the hosts.

In particular embodiments, the operator placement component may minimize the number of processing hosts used to execute the operators of the global query graph. This may be achieved by allocating new hosts only when an overload situation of already allocated hosts is detected. This, in turn, translates directly to the lower overall cost for the execution of a given query graph in the cloud-based streaming system.

Cost Model and Cost Calculation

Cloud providers may not offer an interface which would allow its users to monitoring in real-time, the current cost of their applications running within the cloud. Embodiments can afford a generic solution which tackles this problem.

In particular, embodiments of complex event processing systems may be agnostic to both: (1) the underlying cloud, and (2) the streaming system. Embodiments may maintain a generic cost model accommodating different cost models employed by commercial cloud providers. In this manner, embodiments can be used to monitor in real-time the current monetary cost of the execution of any streaming system on top of any cloud infrastructure.

In order to define a generic cost meta-model, the cost models of several popular cloud providers have been studied. As result of this analysis it has been found that nearly all cloud providers charge the resources following a pay-per-use model based on predefined cloud instance configurations (some cloud providers charging based on the sum of all used resources and not based on instance configurations).

In a pay-per-use model based upon predefined cloud instance configurations, a user can configure the system as comprising different instances, and will be billed according to the configuration. The billing granularity can be specific to each cloud provider, and ranges from once per hour up to once per month.

An instance configuration describes a certain CPU type, RAM, and persistent storage, as well as a limit on an outgoing and incoming network traffic. In many scenarios an amount of persistent storage by a streaming system may be negligible, and thus this aspect may not be reflected by a particular meta-model.

The following parameters may be used for a generic cost model according to an embodiment.

$P_{CPU}(t)$ represents the price for using one processing core for t time units.

$P_{RAM}(t)$ represents the price for 1 GB of main memory for t time units.

$P_{NET\leftarrow}$ represents the price for 1 GB of incoming network traffic.

$P_{NET\rightarrow}$ represents the price for 1 GB of outgoing network traffic.

$F(t)$ represents upfront fixed costs (including reserved instances fee) broken down to t time units.

Prices in particular models may be according to the Euro cent. Some cloud providers distinguish in their cost model between long running (so called reserved instances), and on demand instances which are used to handle peak load situations.

To reflect this, certain embodiments may use a factor R. Factor R describes the number of reserved instances used by the system. Assuming that the number of reserved instances in the system is fixed and that the total number of hosts in the system is N, the total CPU price $P_{CPU}(t)$ can be computed as:

$$P_{CPU}(t) = \frac{R}{N} \cdot P_{CPU,Res}(t) + \left(1 - \frac{R}{N}\right) \cdot P_{CPU,Dem}(t) \quad (1)$$

where $P_{CPU,Res}(t)$ is a price for a reserved instance for t time units, and $P_{CPU,Dem}(t)$ is a price for an on demand instance for t time units.

Since multiple operators can share the same host (e.g. FIG. 3), a first step in calculating a cost per query may be to split the per host costs between operators (and effectively users) utilizing the given host. Therefore certain embodiments may measure resource consumption for operators, and distributes it proportionally across operators by scaling it to match the per host cost.

Figure 5:
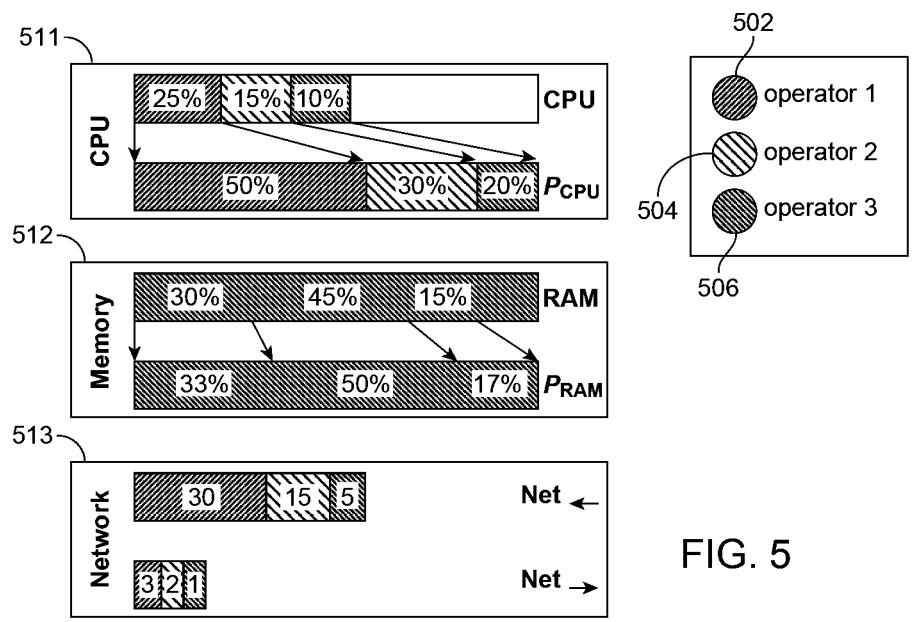
FIG. 5 is a set of simplified diagrams showing an example for cost distribution over queries.

FIG. 5 shows an example of how an embodiment may distribute costs (CPU 511, memory 512, network 513) to a set of three operators 502, 504, and 506. Here, the sum of the CPU consumption of these operators in the current billing period adds up to 50%.

However, since the complete time period has to be charged for the given host, the price for all operators is proportionally scaled up. This means that initial 25% CPU usage of the first operator is scaled up to 50% of the CPU price. The same process may be repeated for other operators and for the costs of the memory. The scaling procedure may not be necessary for the network resources, as in this case users are charged only for the truly consumed bandwidth.

The costs C(Q, t) for a query Q and time t, comprises three major parts: the CPU cost, the RAM cost, and the networking costs (see Equation 2):

$$C(Q, t) = C_{CPU}(Q, t) ++ C_{RAM}(Q, t) ++ Q_{NET}(Q, t). \quad (2)$$

Each of the right hand side expressions in this Equation (2) (i.e.: $C_{CPU}(Q,t)$, $C_{RAM}(Q,t)$, and $C_{NET}(Q,t)$), can be expressed as sum of the costs for all operator instances $o_i$ belonging to the query Q. Operator instance $o_i$ represents an instance of the operator o running on host i. This notation allows modeling the scenario where several parallel instances of the same operator are executed in a stream partitioning scenario, where each operator instance $o_i$ works only with a partial input stream.

The total cost for all instances can be thus expressed as:

$$C(Q, t) = \sum_{o_i \in Q} (C_{CPU}(o_i, t) ++ C_{RAM}(o_i, t) ++ Q_{NET}(o_i, t)) \quad (3)$$

To compute the CPU cost per operator instance $o_i$ running on the host $H(o_i)$ the relative CPU consumption of the operator instance $o_i$ is calculated as ratio of its consumption and the sum of consumption of all operators on this host:

$$C_{CPU}(o_i, t) = \frac{\frac{1}{S} CPU(o_i, t)}{\sum_{o_j \in H(o_i)} CPU(o_j, t)} P_{CPU}(t) \quad (4)$$

where S is the number of queries sharing the operator $o_i$, $CPU(o_i,t)$ is the CPU consumption by the operator $o_i$ for time t, and $\Sigma o_j \in H(o_i)$ is the sum over operators running on the same host $(H(o_i)$ as the operator $o_i$.

An analogous equation can be used to calculate the RAM cost for the operator instance $o_i$ running on the host $H(o_i)$:

$$C_{RAM}(o_i, t) = \frac{\frac{1}{S} RAM(o_i, t)}{\sum_{o_j \in H(o_i)} RAM(o_j, t)} P_{RAM}(t) \quad (5)$$

where S is the number of queries sharing the operator RAM $(o_i,t)$ is the RAM consumption by the operator $o_i$ for time t, and $\Sigma o_j \in H(o_i)$ is the sum over operators running on the same host $(H(o_i)$ as the operator $o_i$.

For the networking costs, the absolute used incoming $(NET_\leftarrow(o_i))$ and outgoing $(NET_\rightarrow(o_i))$ bandwidth by the operator $o_i$ is used to compute the cost per operator:

$$C_{NET}(o_i) = \frac{1}{S}(NET_\leftarrow(o_i, t) \cdot P_{NET_\leftarrow} ++ NET_\rightarrow(o_i, t) \cdot P_{NET_\rightarrow}) \quad (6)$$

The above model allows embodiments to express costs for most of scalable cloud-based streaming systems supporting both query and stream partitioning.

Complex event processing systems according to particular embodiments may offer the ability to monitor and estimate costs of running queries and the cost aware operator placement. In addition, embodiments may permit costs to be explained to the user by allowing drilling down to the operator level.

Cost Driven Operator Placement

An operator placement algorithm according to an embodiment may comprise two major steps: (1) an initial operator placement, and (2) the runtime operator placement. Both steps may use bin packing algorithms for assignment of operators to hosts.

At deployment time, no information about selectivity of operators, the processing time per event, nor the data rate of incoming data streams of the new query, may exist. These values can be measured during runtime.

Therefore, an initial step of operator placement may be to calculate these values based on a worst case event rate, a worst case selectivity of 1.0, and/or conservative default values for the processing time of a given operator type. These values can be updated during runtime with statistics provided by probes deployed within the cloud-based streaming engine.

During runtime, the operator placement component is capable of detecting overloaded hosts. If such a situation occurs, the operator placement component may attempt to move out operators from overloaded hosts to the ones with free capacity. The moving is done in such a way so as not to overload the new hosts.

In a second step, underloaded hosts (i.e. hosts with a load lower than a predefined threshold) are freed by moving out their operators to other hosts. The detection of overloaded hosts is done first, in order to avoid a situation when a previously released host has to be allocated again.

The bin packing method may define for each host a CPU capacity ($cap_{CPU}$) and network capacity ($cap_{NET}$) parameters. For an operator instance the CPU consumption can be measured or estimated as $CPU(o_i)$. Similarly, the used network bandwidth can be measured as $NET(o_i)^2$.

According to particular embodiments, RAM used by an operator may not be used by initial bin packing. However, it is measured during runtime and used as an additional criterion for operator to movement.

An operator can be assigned to a host if the sum of all CPU consumed resources on a host does not exceed its CPU capacity, and also the sum of used bandwidth does not exceed the host network capacity. For computing such an assignment, different bin packing strategies can be used.

The following table describes different bin packing strategies.

| Method | Description |
| --- | --- |
| First Fit | Operator is positioned on the first host having sufficient capacity. |
| Best Fit | Hosts are ordered based on their remaining capacity and operator is placed on the one with the best matching free capacity. |
| Decreasing Order | Operators, before assignment, are ordered based on their required capacity. |
| Priority based | Hosts where successors of the current operator are already placed are preferred so as to reduce the used network bandwidth |

Particular embodiments may implement two (2) major strategies (First Fit, Best Fit), and two optional extensions (Decreasing Order, Priority based). Together, these make up a total of six (6) different bin packing versions.

These bin packing strategies can significantly differ when the final assignment results are considered. This translates directly to a monetary cost a given query can impose on the user.

Therefore embodiments may compute for each bin packing method in combination with current cost model, an estimated cost value and tries to use the bin packing strategy, which introduces the lowest cost. This property is further detailed below in connection with the Example.

Cost Estimation and Monitoring

The current costs of a running query, can be computed by observing the resource consumption of the operators contained within a query, and combining those with the underlying cloud cost model. These statistics may be generated by the underlying streaming system and input to the operator placement component. This, in turn, allows for a runtime adaptation of the operator placement.

The cost calculator component stores the latest resource consumption information for the operators. This allows recalculation of current system costs whenever an update to a single operator occurs. The calculation may only be triggered after updates of all current operators are available and is based on aggregated values—this avoids unnecessary cost jitter.

Estimation of the costs may be based on the result of an initial operator placement, which computes an estimated resource consumption for each operator before execution of the bin packing. These estimated values and the computed placement may be sent to the cost calculator, which can compute an estimated cost value for the query.

The accuracy of the estimation depends on the real event rate and the real selectivity of operators, which differs for different scenarios. However, the initial placement may only represent a rough guess. Subsequent runtime optimization may then adapt the system using real, measured data rates and selectivity values.

EXAMPLE

The following example evaluates a complex event processing system according to an embodiment, positioned on top of the Yahoo! Simple Scalable Streaming System (S4). The S4 system has been extended by linking it with the operator placement component. Also implemented are a set of probes running within the S4 and periodically collecting runtime information about the resources of the underlying private cloud.

The S4 system has been deployed on a private cloud with up to eight (8) worker hosts. Each worker host ran up to two S4 instances, and had two cores running at 2.4 GHz and 4 GB of RAM.

The embodiment was evaluated using data from the Frankfurt Stock Exchange (FIG. 1). Historical tick data was replayed at real-time speed using a time driven generator. The generator can be parameterized in a way to achieve a desired target event rate. A tick data stream contains price and volume information for all stocks traded at the Frankfurt Stock Exchange, and is updated for every stock symbol whenever a change in price occurs.

For evaluation purposes, the raw data stream was pre-filtered to select sixty (60) German companies with the highest market capitalization. The resulting tick data stream had a volume of 8 million ticks per day.

Based on the tick data stream, a set of four query templates were defined as set forth in the following Table:

| ID | Name | Description |
|---|---|---|
| 1 | Current Tick Value | Min, max, and current value within last 60 seconds for a specific instrument |

-continued

| ID | Name | Description |
|---|---|---|
| 2 | Simple Financial Pattern | Select all instruments where a difference of more than 100 cent between two consecutive ticks was measured |
| 3 | Custom Index Calculation | Continuously calculate index value for a set of companies |
| 4 | Candle Stick Pattern | Compute first, last, max, and min values within certain time window for specific company |

The query templates may allow for calculation of the current value for a given instrument, detection of a simple pattern, calculation of a custom index, and for computation of basic data needed by the technical analysis using candle stick charts. Templates are parameterizable so that we can use them to derive an arbitrary number of queries.

Three cost models shown in Table 3 were used in the evaluation.

| Model | CPU | RAM | Net$_\leftarrow$ | Net$_\rightarrow$ |
|---|---|---|---|---|
| CPU-based | 0.23/0.073 | 0 | 0 | 0.12 |
| RAM-based | 0 | 0.055 | 0 | 0 |
| Network-based | 0 | 0 | 0.3 | 0.3 |

The first cost model (CPU-based) is based on the AMAZON EC2 and RACKSPACE Cloud cost models. It assumes a fixed price per CPU hour. Depending on whether the CPU is paid as a reserved instance or as an on demand instance, the costs are 0.083 cent per hour and 0.23 cent per hour, respectively. The price for the network outgoing traffic is 0.12 cent per GB, and there are no extra fees, neither for the RAM, nor for the incoming network traffic.

The RAM based cost model is derived from the one used by the SAP Corporate Computing Cloud (SAP $C^3$)—a private cloud existing within the SAP environment. Due to the nature of applications utilized within the SAP $C^3$ the cost model is based solely on the RAM usage and equals 0.055 cent per GB of RAM.

The last cost model (Network-based) is a synthetic one. It is based only on the incoming and outgoing network traffic where each sent or received GB costs 0.3 cent.

Cost Monitoring

Figure 6:
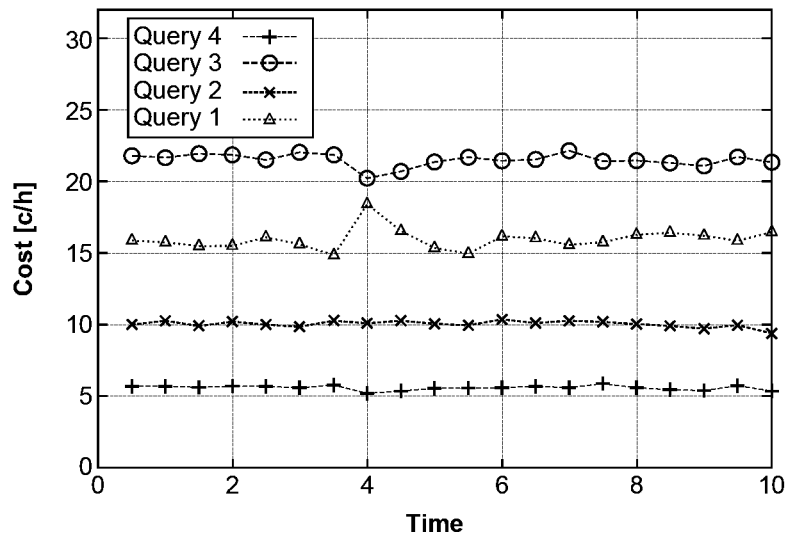
FIG. 6 shows cost for different queries using fixed data rate and fixed cost model.

The first series of experiments measured the cost of the execution of queries running on top of the Yahoo! S4. FIG. 6 shows the results of a first experiment, in which the cost for running a single instance of each of the four query templates is measured. In this experiment, we have fixed the tick data stream rate at 2000 events per second. The measurement was performed for a CPU-based cost model.

It is observed that queries are processing tick data at a relatively fixed cost. The least expensive query being query instantiated from the Candle Stick Pattern template (Query 4), and the most expensive being the query instantiated from the Custom Index Calculation template (Query 3).

In order to help user understand why Query 3 is the most expensive one, embodiments provide explanation for cost functionality. Using the cost explanation functionality, a user can visualize the operators of the Query 3 and their real-time cost.

Figure 7:
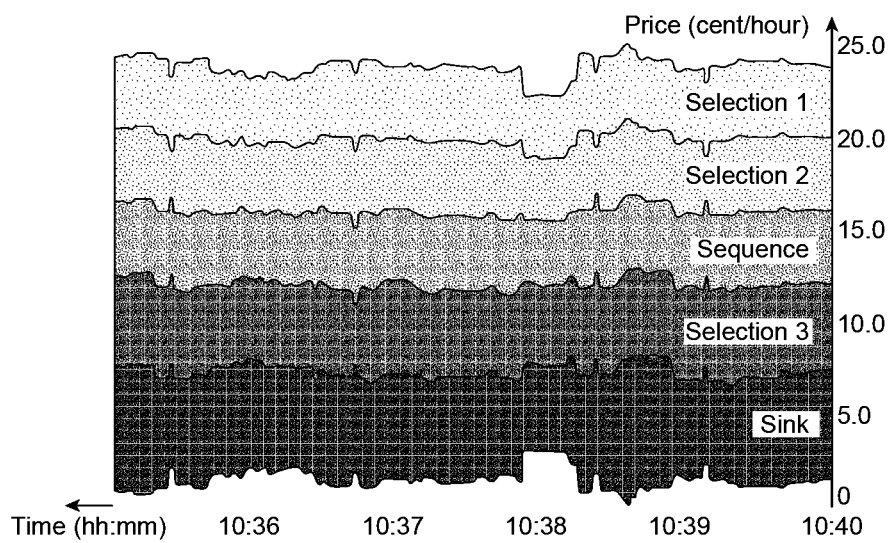
FIG. 7 shows cost monitoring for Query 3 of FIG. 6.

Query 3 comprises five operators: (1) three selections filtering out a set of given instruments constituting an index; (2) an aggregation operator calculating the value of the index within a window of 60 seconds; and (3) and a sink operator outputting the calculated index. Real-time costs for each of the operators of Query 3 are visualized in FIG. 7.

Based on the real-time cost monitoring provided by particular embodiments, a user can conclude that the high costs of Query 3 are almost equally distributed across each of the operators. The sheer number of operators contributes to the high total cost.

Figure 8:
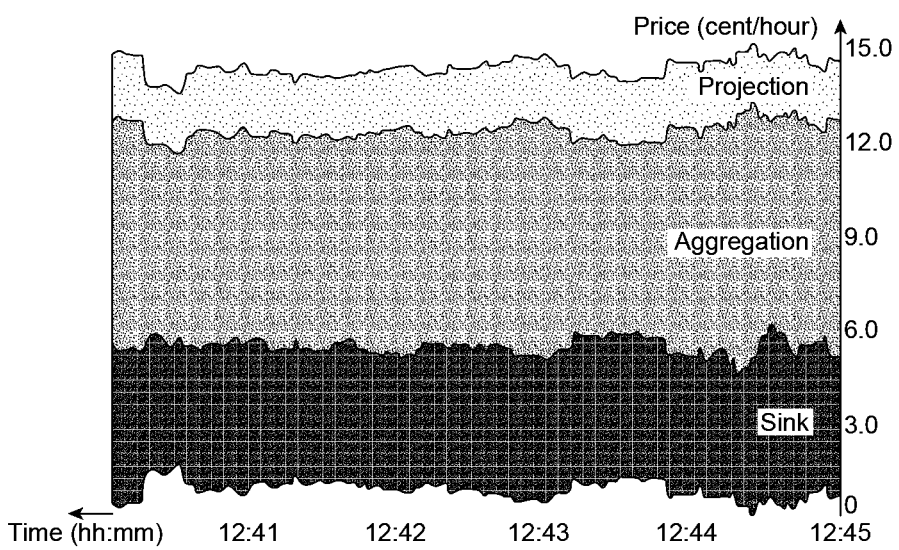
FIG. 8 shows cost monitoring for Query 1 of FIG. 6.

However consideration of the costs for the second most expensive query (Query 1), indicates that it is comprised three operators: (1) a projection operator mapping incoming tick data format to the output data format; (2) an aggregation operator calculating the min, max, and current tick values; and (3) a sink operator outputting the result. FIG. 8 shows that in case of Query 1, the aggregation operator is clearly responsible for the high monetary cost. This is a good indication to the user to tune the query, e.g., by altering the window size, in order to reduce the cost.

Figure 9:
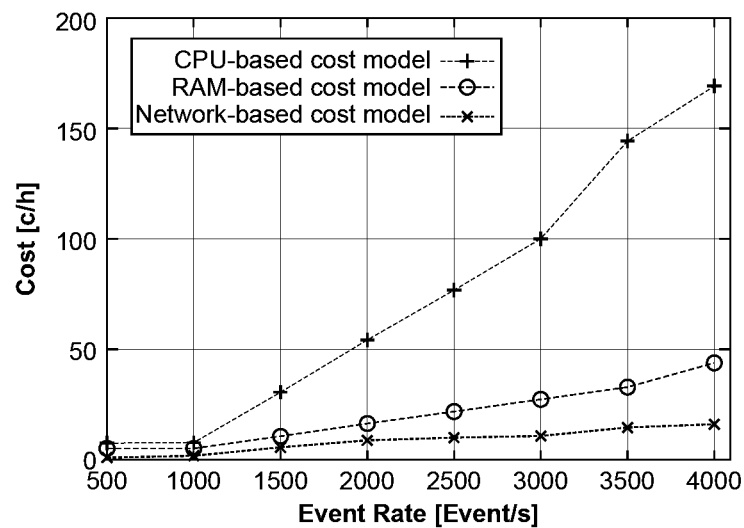
FIG. 9 shows costs for a single query for increasing event rates.

The next experiment evaluates the costs for a single query (Query 1), for different cost models and increasing event rates. The results are shown in FIG. 9.

It can be observed that the costs are increasing along with the event rates, with the CPU-bound cost model being the most expensive one. This can be attributed to the fact that four query templates used in our test setup are CPU bound.

The sharp increase in the costs at the 1000 events per second mark, can be explained by the fact that in order to process 1500 events per second, Yahoo S4 must scale out from one host to two hosts. For every consecutive increase in the event rate a new worker host needs to be added to the Yahoo S4, for a total number of seven (7) worker hosts handling the event rate of 4000 events per second.

Figure 10:
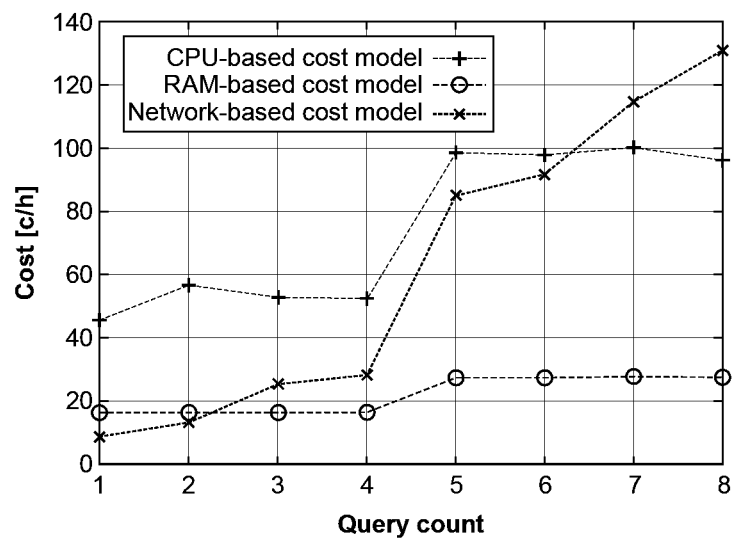
FIG. 10 shows cost for different cost models and increasing number of queries with fixed event rate.

The next experiment evaluates behavior of costs with an increasing amount of queries added to the system for a fixed event rate. FIG. 10 shows the results.

In this experiment the event rate is fixed at approximately 2000 events per second and added queries based on the Current Tick Value template. It can be clearly observed that after adding fifth query to the system, the Yahoo S4 had to scale out and include two new hosts in order to accommodate the query load. Both CPU-based and RAM-based cost models are otherwise stable.

The Network-based cost model exhibits a steady increase, as it is not quantized on a per host basis as with the other two cost models. Instead, it directly reflects the number of sent and received packets.

The sharp increase in costs for the Network-based model after the addition of the fifth query, can be contributed to the extra incoming data streams which are fed into the two new hosts. The data is split outside of the cloud.

Figure 11:
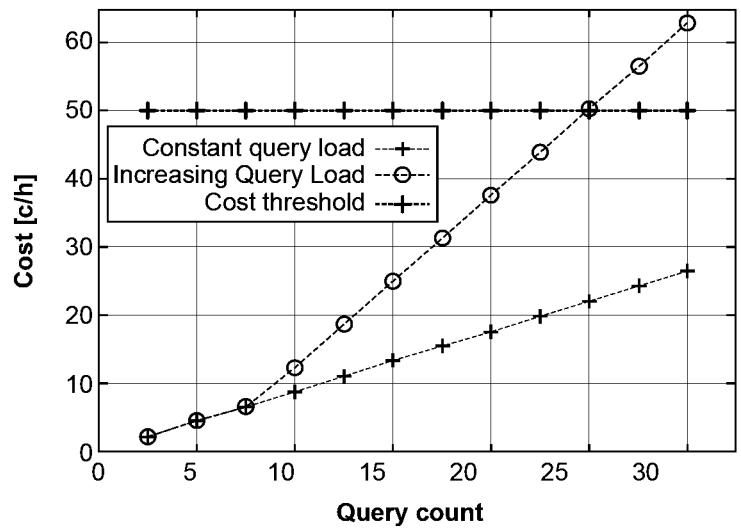
FIG. 11 shows cost estimation and cost throttling.

The two phase approach for operator placement may allow certain embodiments to prevent deployment of queries which could hurt the user specified budget cap. FIG. 11 shows the cost estimation for the system for a constant number of queries.

In particular when a new query is added to the system at time 7:30, embodiments can conservatively estimate the new costs (Increasing Query Load series), and reject the query if the user defined cost threshold is to be exceeded within a specified time frame. The last added query can also be removed in the run-time statistics indicate the violation of the user specified cost threshold.

Multi Query Optimization

Figure 12:
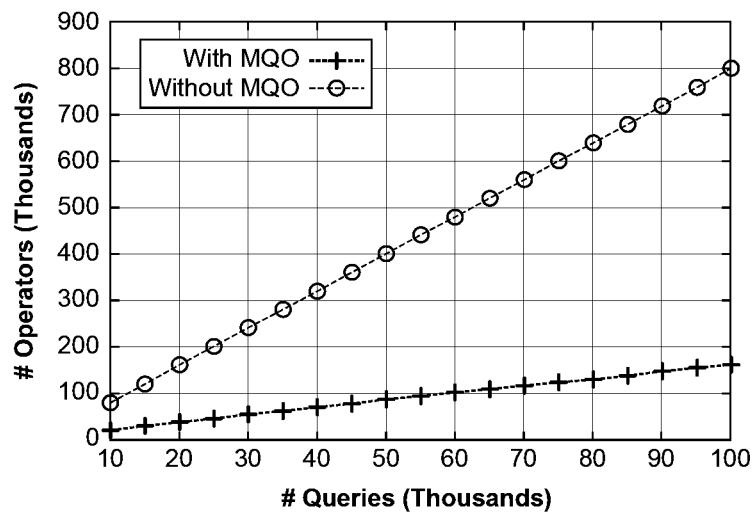
FIG. 12 shows query optimization and resulting decrease in the total number of deployed operators according to one embodiment.

In order to show the benefit of the multi query optimization, an experiment was conducted comparing the size of the global query graph, with and without the multi query optimization. The result of this experiment can be seen in the FIG. 12.

It can be observed that without multiple query optimization for a total amount of 100,000 queries, the total of 800,000 operators needs to be deployed onto the system. When using the multiple query optimization, this amount is reduced to 160.000 operators—a very significant saving of 80%.

The multiple query optimization can also be used to save costs by reusing parts of other queries. This is presented in Table 4, where the costs for executing query 1 and 4, with and without query optimization (MQO), are indicated.

| Query | Proj. | Sel | Aggr | Sink | Sum |
| --- | --- | --- | --- | --- | --- |
| Query 1 (without MQO) | 4.12 | — | 8 | 5.26 | 17.38 |
| Query 1 | 2.11 | — | 6.15 | 5.21 | 13.47 |
| Query 4 (without MQO) | 4.03 | 5.51 | 0.92 | 3.09 | 13.54 |
| Query 4 | 1.68 | 5.49 | 0.91 | 3.09 | 11.17 |

Both queries share a common projection operator, whose costs are split between the both queries in case the operator is reused. This results in a reduced costs for both queries. For query 1, the overall cost can be reduced from 17.38 to 13.47 cent per hour. For query 4, the cost can be reduced from 13.54 to 11.17 cent per hour.

Cost Aware Placement

Figure 13:
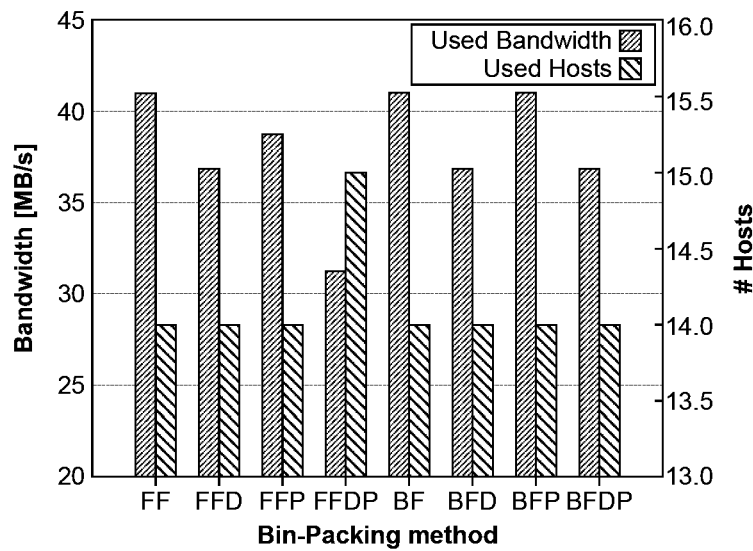
FIG. 13 is a comparison of different bin packing strategies and their influence on the system bandwidth and yield.

In order to achieve cost aware placement of operators in a cloud-based scalable streaming system, the properties of different bin packing methods were studied. FIG. 13 illustrates the results of an experiment to measure the bandwidth and the number of hosts necessary to accommodate 100 queries, at a fixed event rate of 250 events per second.

The First Fit Decreasing Priority method achieves the best bandwidth utilization. However, it is simultaneously the worst one in terms of the number of used hosts. On the other hand, other methods achieve the best host utilization, while simultaneously using significantly more bandwidth (between 13% and 23%) than the First Fit Decreasing Priority method.

Figure 14:
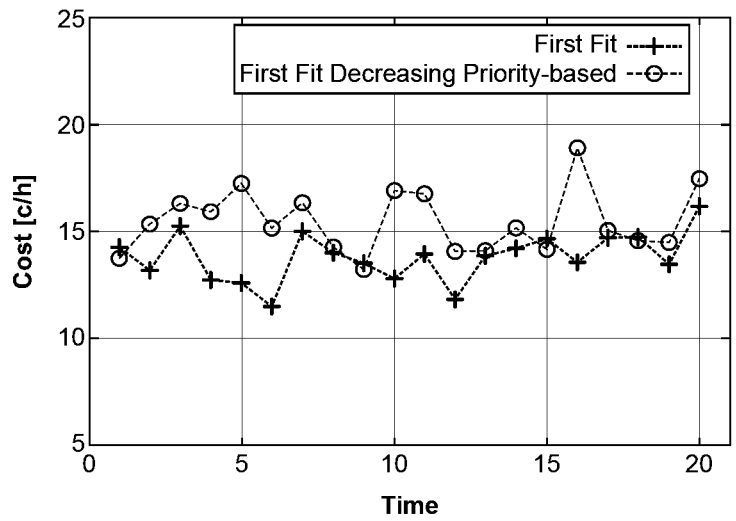
FIG. 14 is an analysis of cost behavior of different bin packing method for CPU-based cost model.

This observation allows embodiments to use the best bin packing method, depending on the underlying cloud cost model. FIG. 14 shows the comparison of costs which are caused by running the system using the First Fit bin packing approach and the First Fit Decreasing Priority bin packing (cf. FIG. 13). FIG. 14 shows the costs for Query 1 (cf. FIG. 6) in a scenario with a fixed total number of queries (four) and a fixed event rate of 1500 events per second. It can be observed that embodiments reduce the cost for running this query by choosing the First Fit algorithm, as opposed to the First Fit Decreasing Priority.

Figure 15:
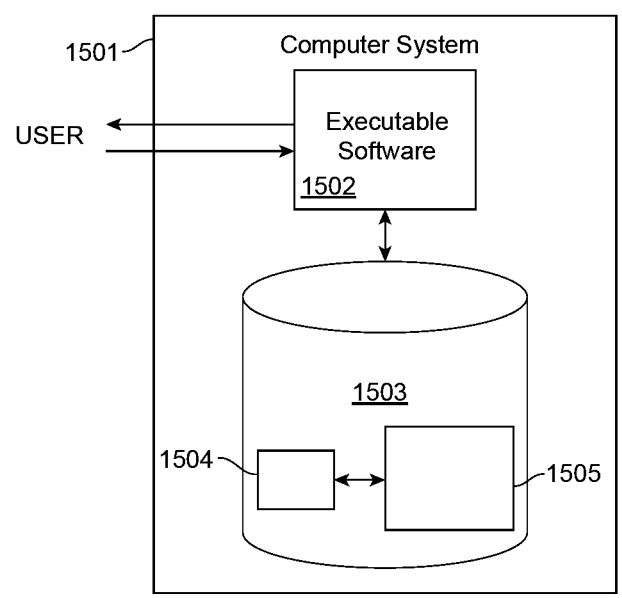
FIG. 15 illustrates hardware of a special purpose computing machine configured to perform cost-based monitoring and optimization according to an embodiment.

FIG. 15 illustrates hardware of a special purpose computing machine configured to perform complex event processing according to an embodiment. In particular, computer system 1500 comprises a processor 1502 that is in electronic communication with a non-transitory computer-readable storage medium 1503. This computer-readable storage medium has stored thereon code 1505 corresponding to a cost determination (e.g. cost calculator and/or cost model). Code 1504 is configured to perform query optimization and/or operator placement function(s). Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 16:
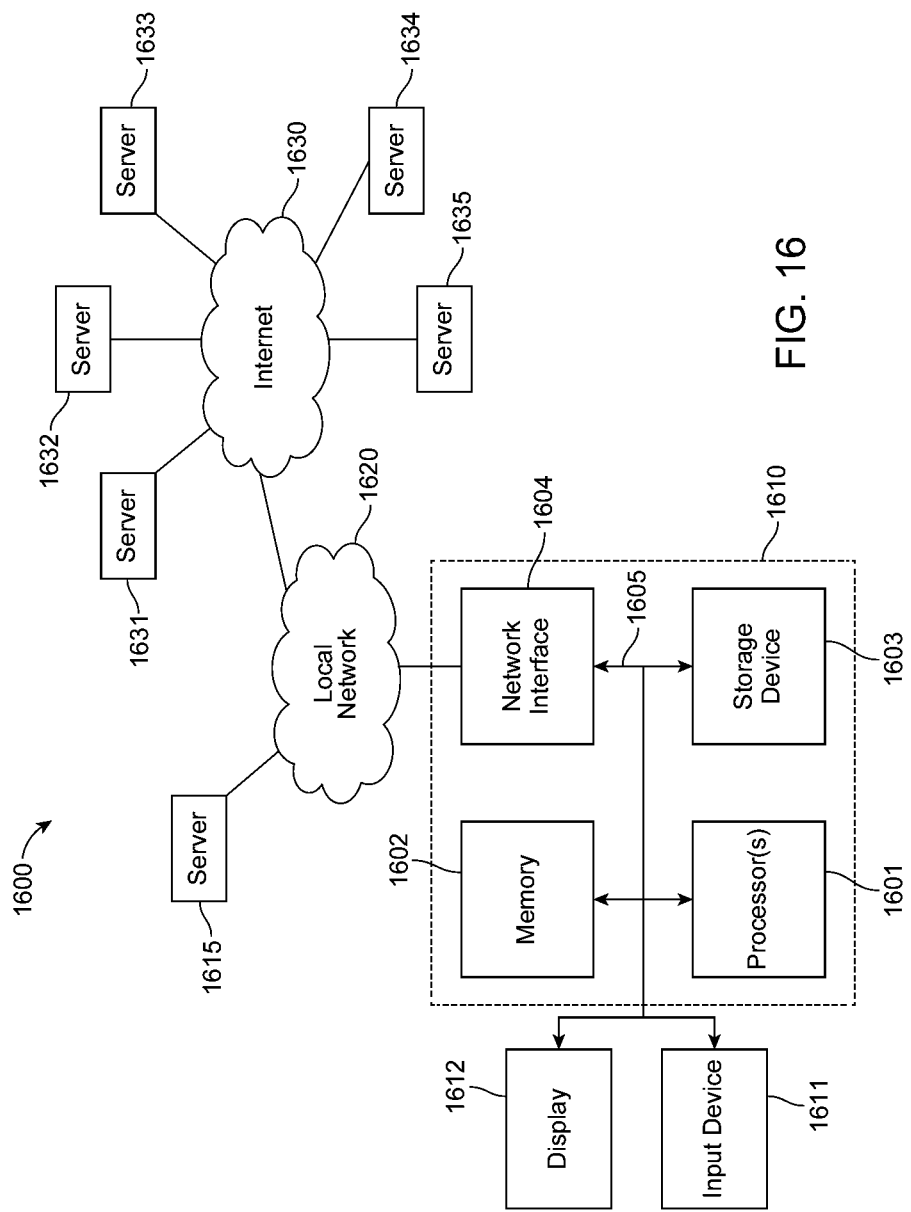
FIG. 16 illustrates an example of a computer system.

An example computer system 1610 is illustrated in FIG. 16. Computer system 1610 includes a bus 1605 or other communication mechanism for communicating information, and a processor 1601 coupled with bus 1605 for processing information. Computer system 1610 also includes a memory 1602 coupled to bus 1605 for storing information and instructions to be executed by processor 1601, including information and instructions for performing the techniques described above, for example. This memory may also be used for storing variables or other intermediate information during execution of instructions to be executed by processor 1601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 1610 may be coupled via bus 1605 to a display 1612, such as a cathode ray tube (CRT) or liquid crystal display (LCD), for displaying information to a computer user. An input device 1611 such as a keyboard and/or mouse is coupled to bus 1605 for communicating information and command selections from the user to processor 1601. The combination of these components allows the user to communicate with the system. In some systems, bus 1605 may be divided into multiple specialized buses.

Computer system 1610 also includes a network interface 1604 coupled with bus 1605. Network interface 1604 may provide two-way data communication between computer system 1610 and the local network 1620. The network interface 1604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1604 sends and receives electrical, electromagnetic, or optical signals that carry digital data streams representing various types of information.

Computer system 1610 can send and receive information, including messages or other interface actions, through the network interface 1604 across a local network 1620, an Intranet, or the Internet 1630. For a local network, computer system 1610 may communicate with a plurality of other computer machines, such as server 615. Accordingly, computer system 1610 and server computer systems represented by server 615 may form a cloud computing network, which may be programmed with processes described herein. In the Internet example, software components or services may reside on multiple different computer systems 1610 or servers 1631-635 across the network. The processes described above may be implemented on one or more servers, for example. A server 1631 may transmit actions or messages from one component, through Internet 1630, local network 1620, and network interface 1604 to a component on computer system 1610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
a cost calculator implemented as a computer central processor component of a complex event processing (CEP) system indexing operators of a query received from a user;
the cost calculator component referencing a cost model including a memory cost, of the CEP system to assign an operator placement algorithm to the query;
a query optimization component of the CEP system performing a query optimization to generate an optimized query;
an operator placement component of the CEP system using the operator placement algorithm with the optimized query, to calculate a chosen operator placement;
the operator placement component deploying the optimized query onto a scalable streaming system;
the cost calculator component tracking and collecting runtime information regarding the optimized query on an operator level and on a query level from the scalable streaming system; and
the cost calculator component calculating tracked and collected costs of the optimized query and communicating the tracked and collected costs to the user.

2. A method as in claim 1, the cost model further comprising a processing cost and a network cost.

3. A method as in claim 1, the chosen operator placement calculated according to a bin packing approach.

4. A method as in claim 1, the operator placement algorithm comprising:
an initial operator placement; and
a subsequent runtime operator placement.

5. A method as in claim 1, the query optimization creating a global query graph.

6. A method as in claim 5, the query optimization reusing common parts between the query and the global query graph.

7. A non-transitory computer readable storage medium embodying a computer program for performing a method, said method comprising:
a cost calculator component of a complex event processing (CEP) system indexing operators of a query received from a user;
the cost calculator component referencing a cost model including a memory cost, of the CEP system to assign an operator placement algorithm to the query;
a query optimization component of the CEP system performing a query optimization to generate an optimized query;
an operator placement component of the CEP system using the operator placement algorithm with the optimized query, to calculate a chosen operator placement;
the operator placement component deploying the optimized query onto a scalable streaming system;
the cost calculator component tracking and collecting runtime information regarding the optimized query on an operator level and on a query level from the scalable streaming system; and
the cost calculator component calculating tracked and collected costs of the optimized query and communicating the tracked and collected costs to the user.

8. A non-transitory computer readable storage medium as in claim 7, the cost model further comprising a processing cost and a network cost.

9. A non-transitory computer readable storage medium as in claim 7, the chosen operator placement calculated according to a bin packing approach.

10. A non-transitory computer readable storage medium as in claim 7, the operator placement algorithm comprising:
   an initial operator placement; and
   a subsequent runtime operator placement.

11. A non-transitory computer readable storage medium as in claim 7, the query optimization creating a global query graph.

12. A non-transitory computer readable storage medium as in claim 11, the query optimization reusing common parts between the query and the global query graph.

13. A computer system comprising:
   one or more hardware processors;
   a software program, executable on a hardware processor of said computer system, the software program instructing:
   a cost calculator component of a complex event processing (CEP) system, to index operators of a query received from a user;
   the cost calculator component to reference a cost model including a memory cost, of the CEP system to assign an operator placement algorithm to the query;
   a query optimization component of the CEP system to perform a query optimization to generate an optimized query;
   an operator placement component of the CEP system to use the operator placement algorithm with the optimized query, to calculate a chosen operator placement;
   the operator placement component to deploy the optimized query onto a scalable streaming system;
   the cost calculator component to track and collect run-time information regarding the optimized query on an operator level and on a query level from the scalable streaming system; and
   the cost calculator component to calculate tracked and collected costs of the optimized query and to communicate the tracked and collected costs to the user.

14. A computer system as in claim 13, the cost model further comprising a processing cost and a network cost.

15. A computer system as in claim 13, the chosen operator placement calculated according to a bin packing approach.

16. A computer system as in claim 13, the operator placement algorithm comprising:
   an initial operator placement; and
   a subsequent runtime operator placement.

17. A computer system as in claim 13, the query optimization creating a global query graph.

18. A computer system as in claim 17, the query optimization reusing common parts between the query and the global query graph.

* * * * *